US008126575B2

(12) United States Patent
Attarwala

(10) Patent No.: US 8,126,575 B2
(45) Date of Patent: Feb. 28, 2012

(54) UNIVERSAL MODEL PREDICTIVE CONTROLLER

(75) Inventor: Fakhruddin T Attarwala, Princeton, NJ (US)

(73) Assignee: Fakhruddin T Attarwala, Princeton, NJ (US)

( * ) Notice: Subject to any disclaimer, the term of this patent is extended or adjusted under 35 U.S.C. 154(b) by 520 days.

(21) Appl. No.: 12/383,485

(22) Filed: Mar. 25, 2009

(65) Prior Publication Data

US 2009/0287319 A1 Nov. 19, 2009

Related U.S. Application Data

(60) Provisional application No. 61/070,924, filed on Mar. 26, 2008, provisional application No. 61/197,366, filed on Oct. 27, 2008, provisional application No. 61/201,165, filed on Dec. 8, 2008.

(51) Int. Cl.
*G05B 13/02* (2006.01)
*G05B 11/01* (2006.01)
*G05B 11/32* (2006.01)
*G05D 17/00* (2006.01)
*G05D 23/00* (2006.01)
*G06G 7/50* (2006.01)
*G06G 7/58* (2006.01)

(52) U.S. Cl. ............... 700/29; 700/19; 700/33; 700/44; 700/45; 700/67; 700/295; 700/299; 700/300; 703/9; 703/10; 703/11; 703/12

(58) Field of Classification Search .............. 700/19, 700/29, 33, 44, 45, 67, 295–300; 703/9–12
See application file for complete search history.

(56) References Cited

U.S. PATENT DOCUMENTS

| 3,079,079 | A | * | 2/1963 | Phister, Jr. et al. | 700/268 |
| 3,795,916 | A | * | 3/1974 | Wallace et al. | 714/55 |
| 4,374,703 | A | * | 2/1983 | Lebeau et al. | 162/253 |
| 5,481,873 | A | * | 1/1996 | Saruwatari et al. | 60/421 |
| 6,056,781 | A | * | 5/2000 | Wassick et al. | 703/12 |
| 6,108,587 | A | * | 8/2000 | Shearer et al. | 700/200 |
| 6,493,686 | B1 | * | 12/2002 | Francone et al. | 706/12 |
| 6,516,288 | B2 | * | 2/2003 | Bagne | 702/179 |
| 6,724,606 | B2 | * | 4/2004 | Seale et al. | 361/160 |

(Continued)

OTHER PUBLICATIONS

Ji et al., "FCC Unit Modeling, Identification and Model Predictive Control, A Simulation Study", 2002, Elsevier, p. 311-325.*

(Continued)

*Primary Examiner* — Albert Decady
*Assistant Examiner* — Thomas Stevens

(57) ABSTRACT

A method for building robust model predictive controller universally applicable is presented based on the innate process characteristics independent of the method of control actuation. The method of universal MPC design permits proper configuration of requisite regulatory control loops for measured and unmeasured disturbance rejections consistent with the underlying innate process characteristics and their embedding within the overall process unit model predictive controller. The method of universal MPC design requires that manipulated variables process value based model (PV-based models) be used in control and optimization in place of the customary set point based models (SP-based models) or control output based models (OP-based models). The PV-based models are devoid of the manipulated variables regulatory controllers response and tuning. Based on the PV-based models, an alternate method of MPC called PV-based MPC is presented that is most robust and adaptable of possible three types of MPC. Based on the universal MPC design, the prior art MPC can be adapted to improve its robustness at or near control valve saturation.

25 Claims, 11 Drawing Sheets

U.S. PATENT DOCUMENTS

Figure 4:
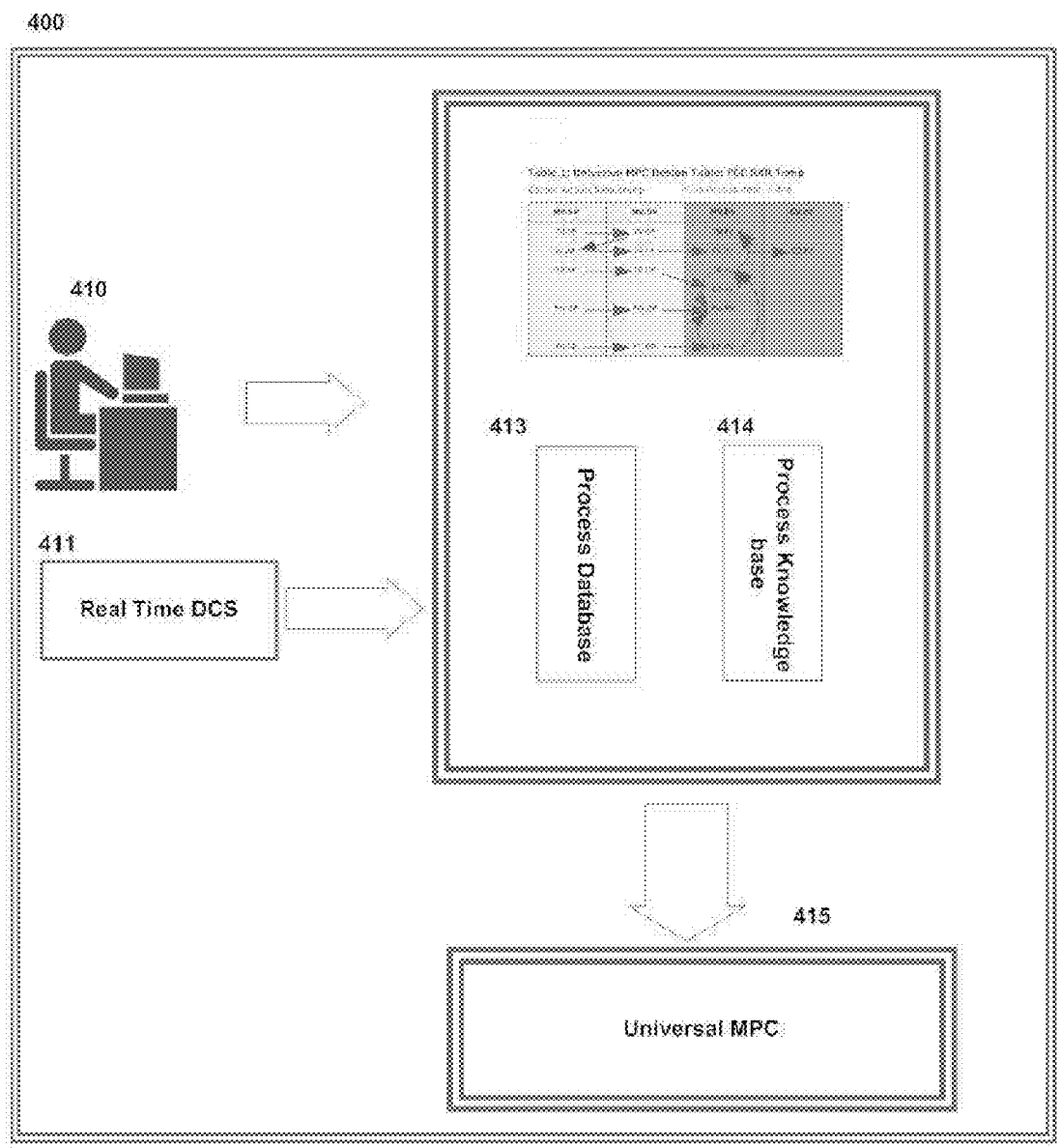

| | | | |
|---|---|---|---|
| 6,985,779 B2 * | 1/2006 | Hsiung et al. | 700/19 |
| 7,187,089 B2 * | 3/2007 | Fukano et al. | 307/100 |
| 7,187,989 B2 * | 3/2007 | Attarwala | 700/29 |
| 7,194,318 B2 * | 3/2007 | Attarwala | 700/29 |
| 7,263,473 B2 * | 8/2007 | Cutler | 703/2 |
| 7,831,318 B2 * | 11/2010 | Bartee et al. | 700/29 |
| 2002/0038195 A1 * | 3/2002 | Bagne | 702/176 |
| 2005/0239598 A1 * | 10/2005 | Bauerle et al. | 477/111 |
| 2008/0103748 A1 * | 5/2008 | Axelrud et al. | 703/12 |

OTHER PUBLICATIONS

Attarwala et al., "Alkylation Unit Control with Robust Multivariable Predictive Control Technology", 2000, Information Management, 6 pg.*

Attarwala et al., "A Methodology for Constructing Expert Systems", 1985, R & D Management, p. 141-149.*

* cited by examiner

Table 1: Universal MPC Design Table: FCC RXR Temp

111 → Control Actions Relationship    Core Process Relationship ← 110

| MV.SP | MV.OP | MV.PV | CV.PV |
|---|---|---|---|
| TN.SP | →TN.OP | TN.PV | ←──── 112 |
| FA.SP | →FA.OP | FA.PV | →CO.PV |
| TR.SP | →TR.OP | TR.PV | |
| | | CX.PV | |
| PW.SP | →PW.OP | PW.PV | |
| FD.SP | →FD.OP | FD.PV | |
| | Feed Forward Variables | TA.PV | |

TN → Regen Temperature          CO → %CO in Regen Flue Gas
TR → Riser Temperature          CX → Catalyst Circulation Rate
PW → Wet Gas Compressor Suction Pressure
FD → FCC Feed                   TA → Ambient Air Temp

Table 1.1: Universal MPC Design Table FCC RXR Temp

Control Actions Relationship    Core Process Relationship

| MV.SP | MV.OP | MV.PV | CV.PV |
|---|---|---|---|
| | | | TN.PV ← 120 |
| FA.SP | →FA.OP | FA.PV | →CO.PV |
| TR.SP | →TR.OP | TR.PV | |
| | | CX.PV | |
| PW.SP | →PW.OP | PW.PV | |
| FD.SP | →FD.OP | FD.PV | |
| | Feed Forward Variables | TA.PV | |

TN.PV recast as CV.PV

TN → Regen Temperature          CO → %CO in Regen Flue Gas
TR → Riser Temperature          CX → Catalyst Circulation Rate
PW → Wet Gas Compressor Suction Pressure
FD → FCC Feed                   TA → Ambient Air Temp

Fig 1

Table 2: Universal MPC Design Table: FCC RXR Temp — 210
Control Actions Relationship   Core Process Relationship — MV.PV Expansion

| MV.SP | MV.OP | MV.PV(1) | MV.PV(2) | CV.PV |
|---|---|---|---|---|
| TN.SP | »TN.OP | | TN.PV | |
| FA.SP | »FA.OP | »FA.PV | | »CO.PV |
| TR.SP | »TR.OP | | TR.PV | |
| | | | CX.PV | |
| PW.SP | »PW.OP | »PW.PV | | |
| FD.SP | »FD.OP | | »FD.PV | |
| | Feed Forward Variables | TA.PV | | |

TN → Regen Temperature           CO → %CO in Regen Flue Gas
TR → Riser Temperature           CX → Catalyst Circulation Rate
PW → Wet Gas Compressor Suction Pressure
FD → FCC Feed                    TA → Ambient Air Temp

Fig 2

Table 3: Universal MPC Design Table: FCC RXR Temp

Control Actions Relationship   Core Process Relationship

| MV.SP | MV.OP | MV.PV | CV.PV |
|---|---|---|---|
| TN.SP | →TN.OP | TN.PV | |
| FA.SP | →FA.OP | FA.PV | CO.PV |
| TR.SP | →TR.OP | TR.PV | |
| | | CX.PV | |
| PW.SP | →PW.OP | PW.PV | |
| FD.SP | →FD.OP | FD.PV | |

310 SP-based Model — As in Prior Art

311 Op-based Model

TN → Regen Temperature  
TR → Riser Temperature  
PW → Wet Gas Compressor Suction Pressure  
FD → FCC Feed  
CO → %CO in Regen Flue Gas  
CX → Catalyst Circulation Rate

Fig 3

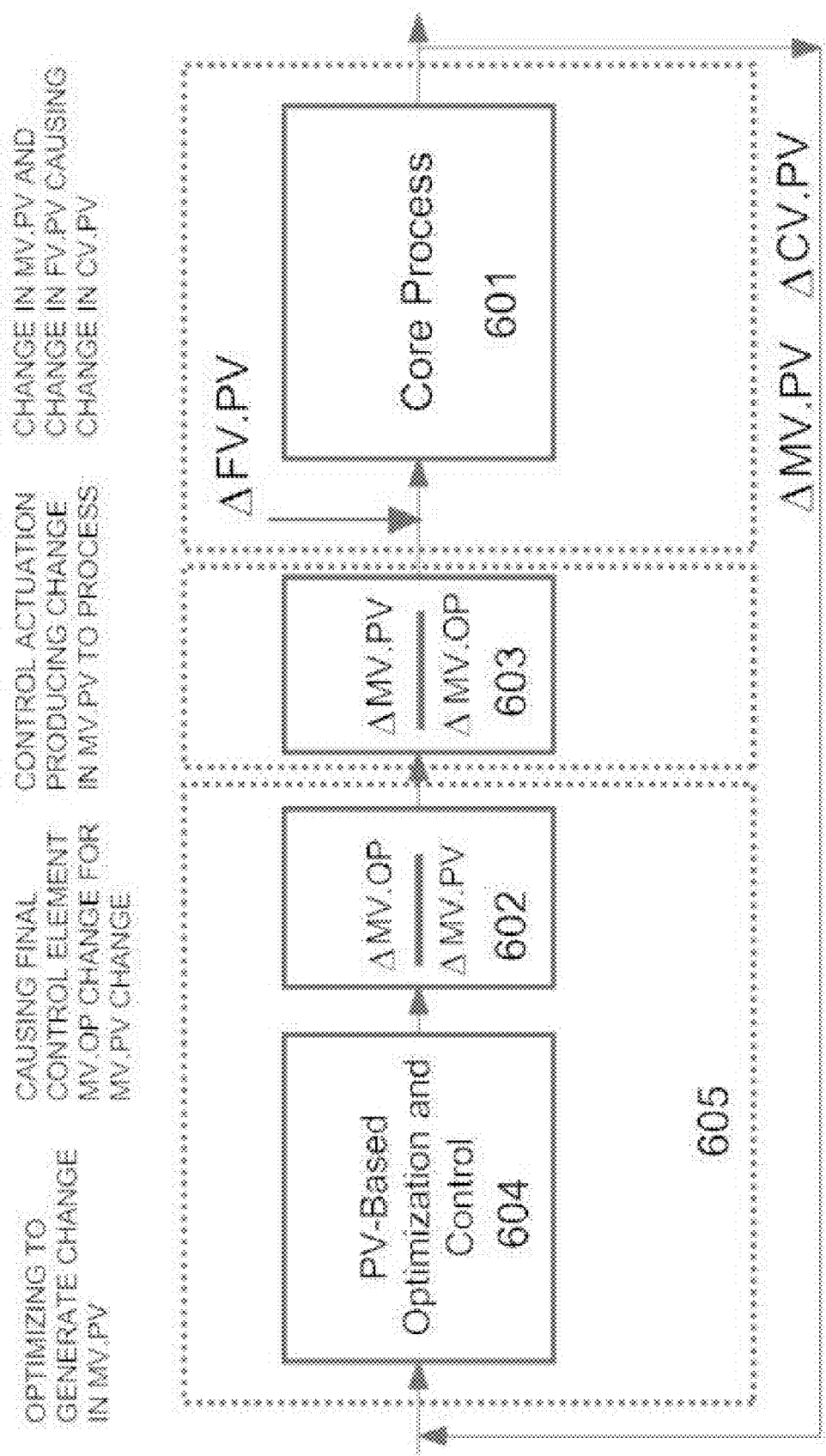
Fig 6.1

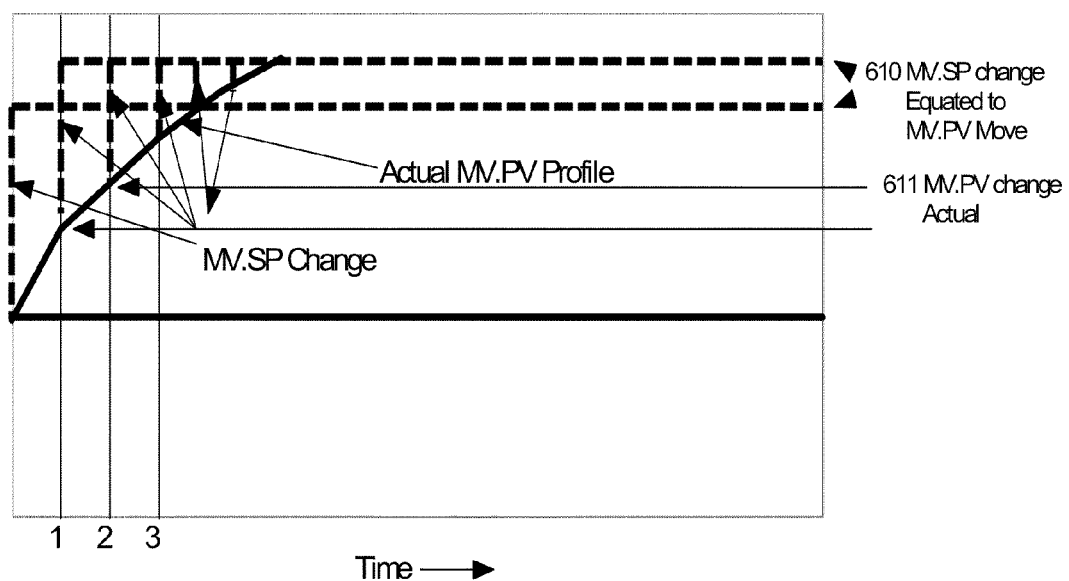
Fig 6.2

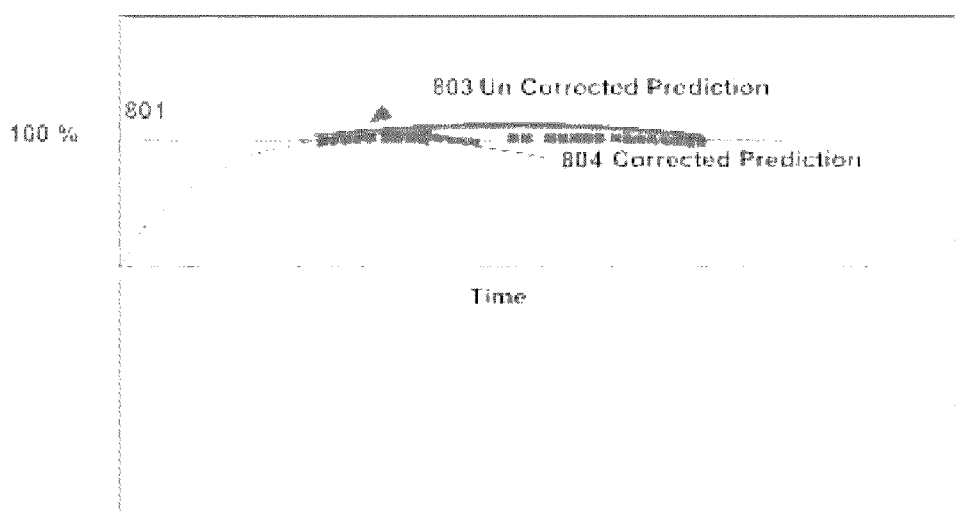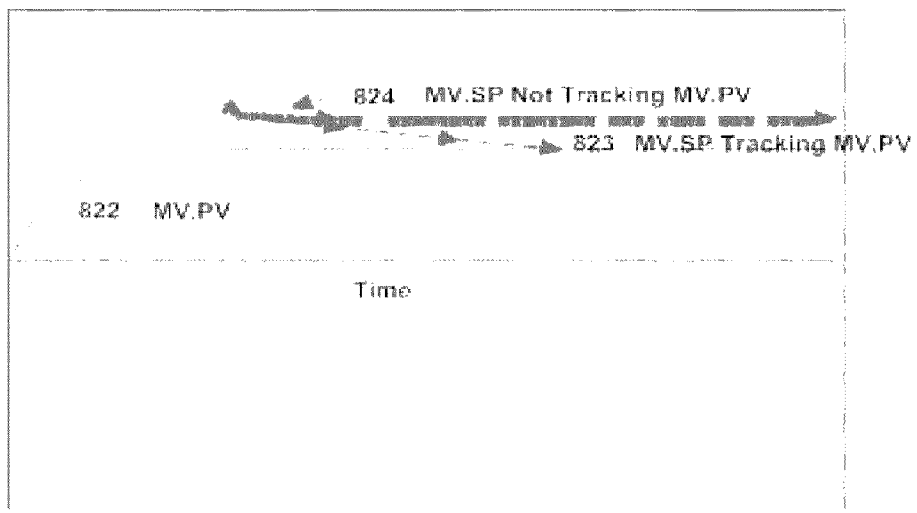
Fig 8

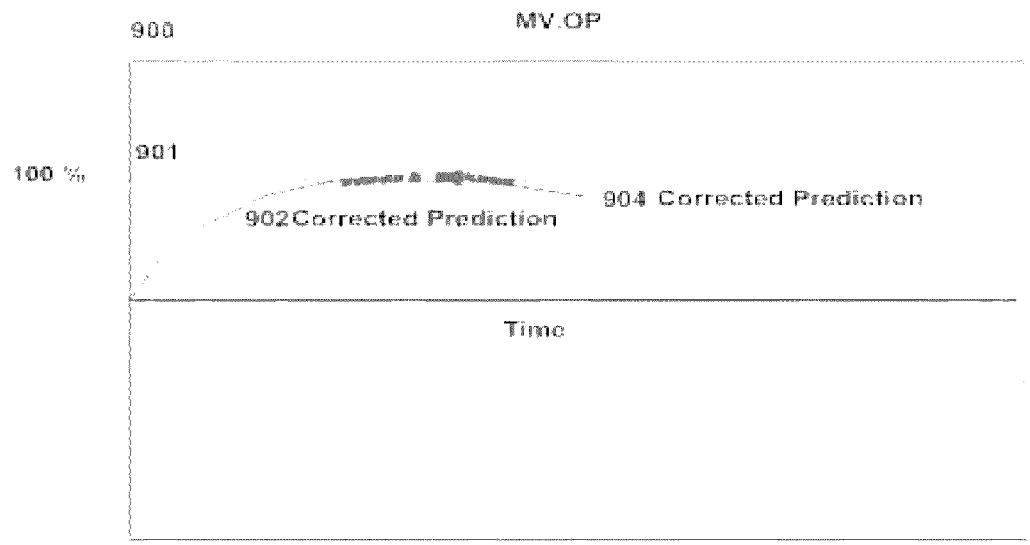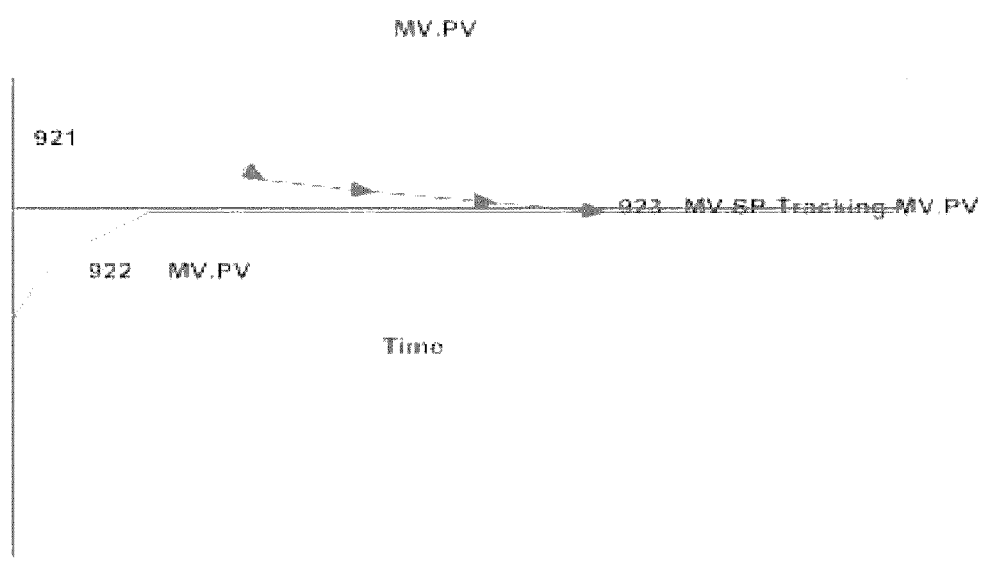
Fig 9

UNIVERSAL MODEL PREDICTIVE CONTROLLER

This patent claims benefits of prior applications 61/070,924, filed Mar. 26, 2008, 61/197,366, filed Oct. 27, 2008, and 61/201,165, filed Dec. 8, 2008.

FEDERALLY SPONSORED RESEARCH

Not Applicable

SEQUENCE USING OR PROGRAM

Not Applicable

BACKGROUND

1. Field of the Invention

This invention relates to designing, building and maintaining a multivariable model predictive controller, specifically relating to creating a universal, consistent and robust design for a process operation in general.

2. Background of the Invention

Model Predictive Control (MPC) has been in use in industry since early 1980. It forms the backbone of advanced process control in chemical plants, refineries and other process industries. MPC refers to a class of algorithms that compute a sequence of future manipulated variable adjustments in order to minimize the future response of complex multivariable processes. MPC performs real time optimization and control of simple to complex processes. A MPC controller employs models of one form or other of the process to predict the effect of past changes of manipulated variables and measured disturbances on the output variables under control. The system dynamics are described by an explicit one to one model of the effect on the controlled variable to a unit change in the manipulated variable. A number of different mathematical forms can be used to represent the process effects. Process input and output constraints are included directly in the problem formulation so that future constraints violations are predicted and prevented.

Since its inception, MPC has been widely applied practically to every sector of process industry worldwide with the number of applications approaching in thousands. This technology has been applied aggressively over last 30 years with demonstrated success. However, there has been an undercurrent of weakness of this technology that is increasingly being now recognized. Most if not all of these applications are being re-done, re-engineered and re-deployed. In some cases, the same application is re-engineered to work around current problems only to re-invent the past solutions. In other words, these applications are hoping from one design to next depending on who is doing the project. This problem of inconsistency of design and consequent re-work is wide spread. This is happening even within a large oil company where for instance, for a fluidized catalyst-cracking unit (FCC unit), one will find as many different designs as there are the number of FCC units. To make the matters worst, the same FCC unit will be re-worked with different design three times over and still would not have a robust design.

By now, most large companies have settled on selection of a particular MPC technology available form a number of control vendors such as Honeywell, AspenTech etc and all these re-work is primarily not so much with any change in the MPC technology but more to do with re-formulating of the unit controller configuration based on redressing the past performance shortcomings. Each time this is done, a new design of MPC evolves.

In the prior art there is no method of design that would produce a consistent design of MPC for the same process. Consequently, the experience and knowledge gained from the previous MPC application is hard to retain with a new MPC application even on the same process unit. There is a tendency to re-invent the past solutions and in the process unintentionally either re-create old problems or create new problems.

The simple question is why is that after 25 years of experience of implementing FCC MPC across over 300 refineries worldwide that in the industry there are articles being written about FCC APC. The question is, is it that the FCC unit operation is too complex that it would defy any attempts to control it well. Or, is it that there is something lacking in the application of MPC technology that is not allowing this unit operation to be tamed. Or both. Given the wealth of understanding of the FCC process and its operation, it is implausible that the lack of understanding of the process could be the reason for this problem. Instead, it is plausible that the methodology of application of MPC is not directly and intimately tied to the process knowledge. Or how else one can explain the differences in the design of MPC for FCC. After all, it follows logically that for same process the design of APC should be same. It is not the case that an FCC APC is designed with no understanding of the process. In fact, every APC begins with understanding process flow chart, and detailed discussion of unit operation with the operator and the control engineers. So, then why is that there are still significant differences in FCC APC design? The answer lies in the absence of a method of design of process control that is based fundamentally on the process relationship. The method of design commonly practiced in the industry is at best can be described as an ad hoc process. This invention highlights the lack of structure and consistency of design of an example FCC APC based on the method commonly used and contrast it with a method of control design based on Core Process Relationships.

Numerous unsuccessful attempts have been made by practitioners in the field to address specific issues and problems relating to certain aspects of MPC such as model identification. However, in the prior art the basic form of model used since its inception in 1980 still remains the same. Recently, an alternate form of model based on control valve output in place of customary based on set point has been proposed (U.S. Pat. Nos. 6,980,938, 7,263,473 and 7,447,554) but it only offers a partial solution to mitigating the problem of re-engineering MPC.

U.S. Pat. No. 7,187,989 by the inventor is incorporated by reference into this application in the entirety. This invention addresses the aforementioned issues and describes a methodology for specifying, designing and operating a universal robust model predictive controller (U-MPC). The U-MPC methodology permits a designer to sort out the intrinsic core process relationships from the control valve actuation relationships in order to build a robust controller design that can be implemented in a variety of method of control valve actuations. Based on the separation of the core process relationships and the control action relationships, a new method of model predictive control is presented based on manipulated variable process value based process models in place of the customary control models based on either manipulated variable set point or manipulated variable controller valve output. By definition and design, the PV-based process models used in the U-MPC are devoid of any form of controller dynamics be it PID based or any other form of regulatory controller. The U-MPC basically performs optimization and control in terms of the core process relationships entirely independent of method of control actuation but at the same time relate back to the method of control actuation in any form that may include a cascading regulatory controller or direct control valve actuation. Thus, the method of control actuation can be preserved for what it does best in accordance with the control design considerations. That is, the regulatory controllers can be designed for what is best in regard to disturbance rejection and closed loop performance independently of the optimization and control of the process unit as a whole. In other words, it is not necessary to give up on the regulatory controllers to make the control models devoid of their dynamics and then attempt to do the same disturbance rejection with the process unit model predictive controller.

BRIEF SUMMARY OF THE INVENTION

An object of this invention is to provide a method of designing a multivariable model predictive controller (MPC) that would be robust in accordance with the core process characteristics so that it does not have to be revised except for any change in the process design so that it can be applied universally across all processes and across different process units for same process. Further, the method of design will be applicable to any process and hence universally applicable for robust design of MPC.

It is a further object of this invention to provide such a method that can be used in various implementations of MPC controllers.

It is a further object of this invention to provide a method to generate new MPC controllers for complex multivariable process control when a change has been made in any regulatory controller configuration or tuning.

It is a further object of this invention to generate a computer aided design system that would take the universal design specification of a MPC as input and produce a MPC fully specified and configured ready for its development and implementation. The universal MPC design would be used further to assist both the control engineer and the operator to interact with the MPC in real time for its use.

It is a further object of the invention to provide an on-line adaptable configuration for a MPC controller for configuration changes made by the operator without having to do any new plant testing or controller configuration changes or tuning changes.

The essence of this invention is to offer a direct and simple method of adapting the MPC in accordance with the core process characteristics. The object of this invention is to offer a method of design for MPC that provides a framework that is based on the basic tenets of best practices of process control encapsulated and embedded within it so as to ensure that every MPC is well-designed to begin with.

DRAWINGS

FIG. 1 Universal MPC Design Table for a FCC Unit

FIG. 2 An expanded Universal MPC Design Table

FIG. 3. A Universal MPC Design Table with SP-based model and OP-based model

FIG. 4 An outline design of Computer Aided Design System for U-MPC

Figure 5:
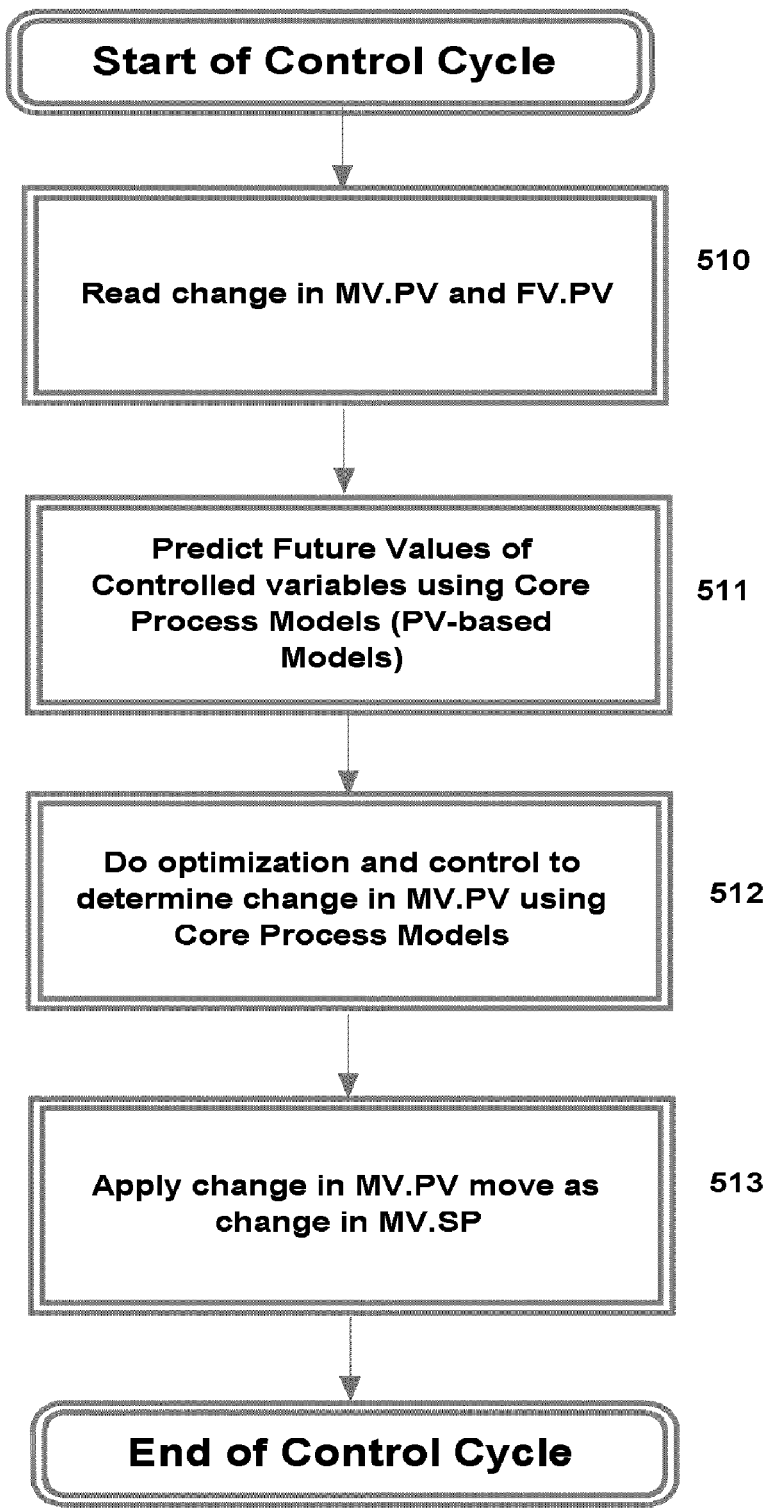

FIG. 5 Universal-MPC control cycle calculation

FIG. 6.1 PV-Based Optimization and Control and Process Feedback

Figure 7:
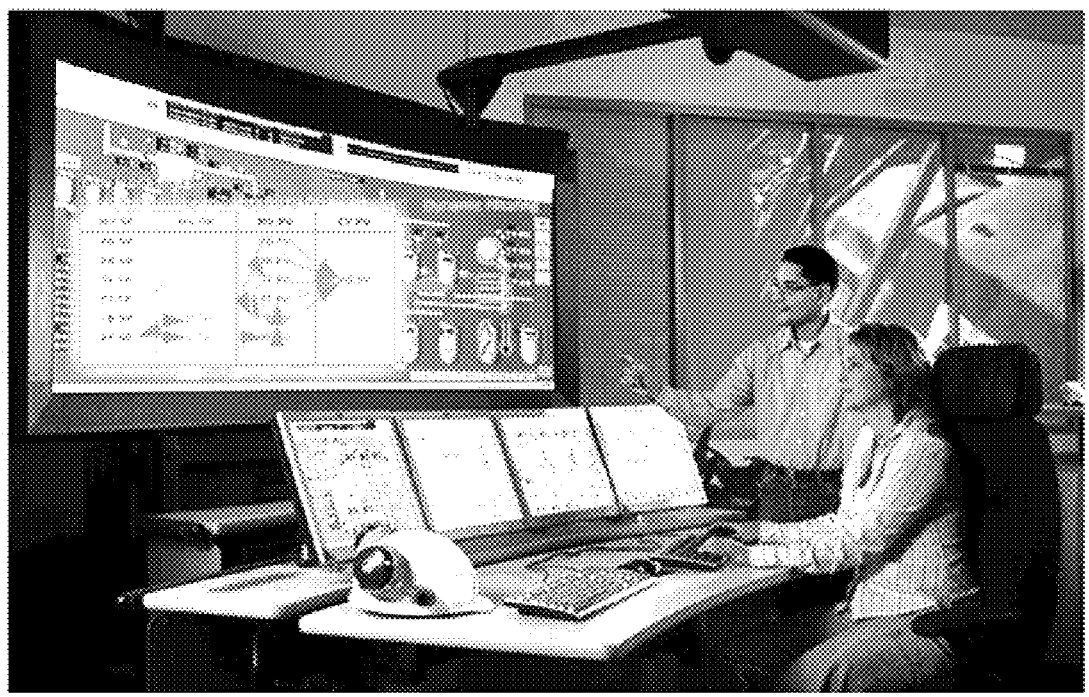
Figure 10:
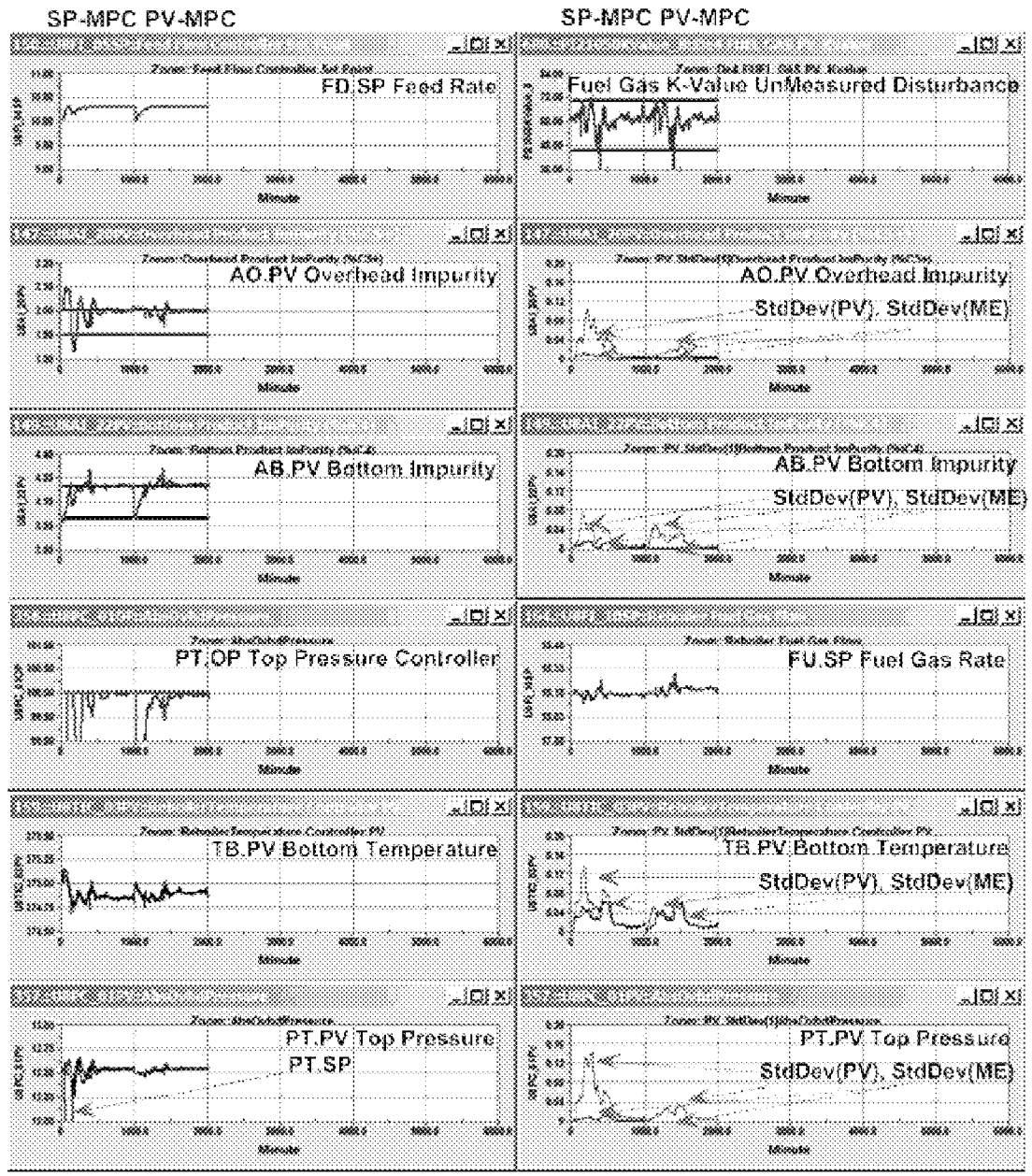

FIG. 6.2 Manipulated variable SP change compared with Manipulated Variable PV change FIG. 7 An example of use of the U-MPC design table as part of improved operator interface FIG. 8 A first embodiment of the present invention for built-in automatic MV.SP tracking MV.PV in the prior art MPC FIG. 9 A second embodiment of the present invention for built-in automatic MV.SP tracking MV.PV in the prior art MPC FIG. 10 A comparison of performance of prior art MPC (SP-based MPC) with universal MPC (PV-based MPC) as per the present invention

DETAILED DESCRIPTION OF INVENTION

The present invention characterizes a MPC in terms of its basic variables and their relationships and incorporates them in a design methodology that would result in a consistent and comprehensive specification for composing a MPC and implementing it. The basic premise of the invention is that a badly designed MPC will perform poorly no matter how well it is tuned later. Further, that a MPC not designed in accordance with the core process characteristic of the process will not and cannot perform consistently and reliably.

In another patent by the present inventor (U.S. Pat. No. 7,187,089), relating to use of core process models in model predictive controller, a process is considered to possess certain innate characteristics that can be modeled as Core Process Models. In particular, it was disclosed that the Core Process Models could be used to derive and update the customary set point based control models used in the prior art model predictive controllers. The present invention relates to a method of design and operation of a universal model predictive controller based on the core process relationships (CPR) (110) relating to the intrinsic process behavior reflective of the underlying physical characteristics, size, material and energy holdup and transport lag present within the process (112). The CPR (110) is what the practitioners in the process industry would commonly agree upon and use it to design the process and modify it. The CPR (110) can be derived from both the understanding of the physical and chemical processes involved and where lacking that can be agreed upon based on the observed effects. The key point is that the CPR (110) is repository of the process knowledge and expertise entirely independent of the method of control. Once, such CPR is known, as disclosed further herein, it can be used to base design of what is described as Universal Model Predictive Control (U-MPC). The U-MPC thus arrived at can then is implemented in any of the alternate method of control and optimization commercially available. This will therefore ensure that each of the alternate controller design would confirm to the same CPR and therefore would be easier to compare and understand differences in their closed loop performance. One of the difficulties in the industry in this respect is that in switching from one method of control and optimization to another, often the design of MPC is altered and therefore, later on it is hard to evaluate performance differences. Because, to a large extent, in the prior art, each alternate method of control and optimization available from different vendors come with their own flavor of how to characterize the process relationships or lack of it. For instance, one vendor method will favor retaining the regulatory controllers, whereas another vendor method will favor opening the regulatory controller. Or in some cases, both of them will have a mix of open-loop and closed-loop regulatory controllers depending on the experience, judgment and preference of the design team. This issue of keeping a regulatory controller loop open or closed is still being debated and re-debated in the industry and therefore is symptomatic of no universal method of designing MPC exists. In fact, in many instances, for the same process unit with different design team, a column reboiler temperature controller will be opened up in one case and closed in another case. By application of the present invention in accordance with the CPR of a process, this issue would become an open and shut case. The CPR used within the methodology would clearly provide a basis for configuring regulatory controllers appropriately. The real processes are far too interacting and are of various characteristics that one controller can control them all. Further, regulatory controller play a vital role in rejecting measured and unmeasured disturbance effects nearest to the source that by opening them up to deal with them in a large MPC is like solving one problem and creating another. In accordance with the present invention, the regulatory controllers configuration is determined by the core process characteristics and not so much by the convenience of the MPC-technology implementation.

As practiced in the industry, design of advanced process control, APC begins with a review of the current method of control of the unit. In particular, the current regulatory controllers are reviewed for their performance and if found to be adequate they are kept intact. If not, initially attempts are made to make the regulatory controller perform more robustly in anticipation of the kind of control actions that would be applied by the APC. If this fails, then more often than not the regulatory controller is opened up for direct manipulation of its output by the APC. The primary guideline here is to preserve what is working, improve upon it and as last resort open it up for direct control. Thus, depending on the design of existing regulatory control loops, their performance and evaluation by the design team, the manipulated variables selection can vary from one APC to another for same process unit. It is obvious that the process of evaluation and determination is not process-centric; instead it is more to do with what is working or not working and making decisions based on the project priorities. Consequently, in a survey of 8 FCC APC known to the author, no two APCs have had the same set of manipulated variables for the reactor/regenerator part of the process. Not surprisingly, at one refinery site, the FCC APC was re-designed three times with three different sets of manipulated variables. Obviously, the question arises is there a way to identify fix set of manipulated variables which would provide a degree of uniformity and consistency in revising (not re-engineering) APC on the same unit. It is true that having the same set of manipulated variables would not necessarily entirely prevent any revision of APC. However, it will certainly prevent all too often re-designing of the APC in terms of manipulated variables as the cure for lack of performance. Instead, having the right manipulated variables to begin with will allow the design team to focus on the real cause of the problems such as process defects, equipment degradation etc. Therefore, the goal is stop reconfiguring APC to improve its performance. Instead, identify the right manipulated variables first time and then deal with other problems to make the APC perform.

In accordance with the present invention, the design of a MPC should begin with an explicitly defined Core Process Relationships in conjunction with its what is described as Control Action Relationships (CAR) (111) together as outlined and described below. The CPR is to be defined using the following variables, namely

| MV.PV | all of the manipulated variables Process Value, |
| CV.PV | all of the controlled variables Process Value, |
| FV.PV | all of the feed forward variables Process Value. |

The CAR is to be defined using the following variables, namely

| MV.SP | all of the manipulated variables Set Point, |
| MV.OP | all of the manipulated variables Out put |

The above set of variables together will be used in a table as shown in FIG. 1 to map cause and effect interrelationships among them. An embodiment of the proposed Universal MPC design table is shown in FIG. 1. The interface is organized to present the following relationship;

| (MV.SP, MV.OP) | 1 |
| (MV.OP, MV.PV) | 2 |
| (MV.PV, CV.PV) | 3 |
| (MV.PV$_i$,MV.PV$_j$)* | 4 |
| (FV.PV, MV.PV) | 5 |
| (FV.PV, CV.PV) | 6 | where, (MV.PV)* represents relationship amongst MV.PV, that is one MV.PV$_i$ affecting the rest of MV.PV.

The Core Process Relationship (CPR) involving (3 & 4) in the tables relate to the innate characteristics of the process entirely independent of the controller actions. The CPR represents how the process behaves and responds irrespective of the method of control used. The CPR changes when the process design changes. Fundamentally, the CPR remains invariant and can be modified to adapt to any process changes without any reference to the method of control. For instance, a change in the process configuration would change the CPR but not because of changes in the method of control.

The other half of the table relates to the basic control action functions. This is shown in terms of MV.SP and MV.OP. The CAR is connected to CPR through the link of MV.OP to MV.PV. This is based on the premise that ultimately all control actions involve MV.OP and any change in MV.OP impacts the related MV.PV. Furthermore, the change in MV.PV in turn affects other MV.PVs and other CV.PVs.

For the purpose of exposition but not limiting, the CPR and CAR in the tables below is elucidated in reference to one particular CV.PV e.g. CO.PV (% carbon monoxide in flue gas) and one or more of the manipulated variables TN.SP/TR.OP/PF.SP/PW.SP/FA.SP etc. The table relates to a FCC unit with self-explanatory variables (see FIGS. 1-3).

It is suggested that these variables be organized in a tabular format such as one shown in FIG. 1, although any suitable method of organizing these variables may also be used such as a network graph etc. The variables are tabulated in accordance with the variable type category. It is further disclosed that the variables be linked with an arrow to indicate cause to effect relationship. The universal MPC design table is clearly marked in terms of two parts, one relating to CAR and the other relating to CPR. In FIG. 1, an exemplary application of the design table for a part of FCC unit relating to the reactor and the regenerator is illustrated. The CPR is built in accordance with the generally accepted and known behavior of these two process elements of a FCC unit. The CPR can be reviewed and improved upon based on the process characteristics alone and not based on how the controller operates. The only connection of the controller to the process is via the links from the manipulated variables output (MV.OP) to the process variables directly affected by the former, which is generally manipulated variables process value (MV.PV). Once both CPR and CAR are mapped out, the design table would form a universal view of both the process and its control that can be used as input to a particular method of control and optimization. Once the design table is agreed upon it can then be used to develop an U-MPC in further details such as the regulatory controllers loops etc.

The variables in the universal design table can be further sub-categorized if desired. For instance, the MV.PV can be opened up in a multi-column (210) in accordance with the nature and frequency of the disturbances affecting it. Further, the column can be set up in terms of the fastest to the slowest frequency of disturbance as shown in FIG. 2. The MV.PV column is expanded into two columns as MV.PV(1) and MV.PV(2) based on the variance of its value. In a FCC unit, FA.PV (main air flow to regenerator) normally has a high frequency PV-values (in the range of say 1-5 seconds) because of the mechanical noises associated with the air blower and the control element within it. Similarly, PW.PV is also shown under this column indicating that it too has high frequency PV variance because of the wet gas compressor mechanical noises. The other MV.PV(2) is of lesser frequency variance (in the range of 30-60 seconds). This categorization of the MV.PV based on the process characteristics are for any control system to take note of this and ensure that the control actions used for it are appropriately designed to operate within the frequency range. If the control actions are unduly outside of the frequency range either being too fast or too slow could cause serious controller malfunction. For instance, it is obvious that these two MVs cannot be adequately controlled if they were to be opened up and place them in a large MPC that will include other slow frequency variables. It is fairly obvious that in the case of MV.PV(1), it is imperative that the regulatory control loops operate at suitable control frequency. Similarly, for MV.PV(2), both TN.PV (120) and TR.PV should have a lower frequency variance based on the fact that the physical holdup of the regenerator bed and the reactor bed respectively would absorb the high frequency variance effects of FA.PV on both of them. A further analysis of the process characteristics could reveal that TR.PV will have its own frequency variance based on the gas phase behavior in the reactor riser than anything else. If the variance of these two MV.PV are found not to be this way, then there is a clear measurement problem or there is a missing MV.PV or FV.PV of high frequency impacting both of these two or one of them. Whatever, the reason, the universal table would need to be fixed until this inconsistency is resolved. As a result of this review, it may be that one or both of these MV.PV(2) would need to be properly re-categorized to place them in the MV.PV column range. The MV.PV categorization in accordance with the process characteristics is important so that the universal MPC design would then conform to it. It should be noted that in FIG. 2, the same CPR is preserved from FIG. 1 albeit with the MV.PV sub-categorization. Similarly, the CV.PV can be further sub-categorized based on the frequency of variance and measurement. It goes without saying that the frequency of variance of CV.PV cannot be more than the fastest MV.PV affecting it. Again, for any reason, the actual plant measurement does not conform with this then again, the table is missing MV.PV or FV.PV or the instrument is malfunctioning.

The above is an embodiment of the present invention wherein the Core Process Relationships are defined as they are for the purpose of arriving at the universal MPC design specification. This expansion of the categorization and its display in the table can all be done in a computer-aided design system (U-MPC CAD system) wherein the software would allow the designer to make changes to the CPR. Those skilled in the arts would appreciate that such an U-MPC CAD system can include a suitable database, expertise base and knowledge base to assist a MPC designer. So that at the end of this process of design, a universal MPC design specification will be produced that then can be used as a blue print for its implementation using any of the commercially available MPC technology packages.

Working backward towards CAR it is clear from the design table in FIG. 2 that FA.OP will be faster acting than TR.OP based on the relative variance frequency of respective MV.PV. Therefore, by implication these control valves manipulation should not be combined in one controller to conflict with the variance frequency of them. However, in many FCC MPC, it is a common practice to include FA.SP and TR.SP in the same MPC control to have same control frequency. Since, a FCC MPC cannot run fast enough for FA.SP, often FCC MPC end up with FA.PV deviating from FA.SP more often and consequently letting TN.PV to deviate from its MPC target as well. Further, if the regulatory controller for TR.SP does not include TN.PV as feed forward variable, then TR.SP would also deviate. In the worst-case scenario, if the FCC MPC breaks FA.SP loop and manipulates FA.OP directly then this problem is exacerbated. The present invention relating to use of universal MPC design table will ensure that the universal MPC is designed in strict compliance with the process characteristics and the control elements behavior and not to fit around how the commercially available MPC package can handle multiple frequency control. It is clear from this exemplary FCC case that a multi-control frequency capability of control is required from the universal MPC.

Regulatory controller control valve saturation has clearly been identified as the key problem areas of the classic MPC in the prior art (U.S. Pat. No. 7,263,473). When a control valve saturates, the manipulated variable effectively switches from automatic mode to manual mode because the regulatory control losses its ability to control the process variable. This implicit switching of mode of a regulatory controller complicates the MPC control actions. In particular, the real process behaves very differently than its normal behavior as represented in the control model. This causes a significant amount of model mismatch arising from the model integrity breakdown. A further complication arises from the fact that the commercially available MPC controllers do not prevent the valve saturation and do not rectify the wind-up condition. Consequently, once the control valve saturates, the anti-windup protection simply stops movement in the flagged manipulated variables that would make the saturation worse. However, the anti-windup protection does not restrict the movements in other MVs that would cause the saturation to worsen. Consequently, many times, in classic MPC, the PV and SP of the manipulated variables will diverge. In contrast, by definition, the PV-based models used in the U-MPC are unaffected by the regulatory controller valve saturation or its non-linear behavior.

In accordance with the present invention, a further embodiment of it includes interconnecting of the universal design table of a process unit with the universal design table of the upstream process unit and the downstream process unit, thus forming an interconnected chain of the design tables. Each of the table in the chain can be designed primarily based on the process characteristics of the process itself. Through the interconnecting variables, any consideration of the effect of the interconnected processes can be dealt with. Thus, this embodiment of the present invention will facilitate building a large-scale U-MPC in a modular manner.

In accordance with the present invention, it is envisaged that the U-MPC CAD system will access the current operating data from the real time control system (411) and calculate the appropriate data characterization that will aid in the categorization of MV.OP, MV.PV and CV.PV. This information is used by the CAD system in aiding in the design process leading to Universal MPC design. This requirement of a universal MPC design require that the MPC must be able to operate with multiple control frequencies in the manner consistent with the MV.PV characterization. In the prior art, all MPC operate in a fixed control frequency and hence clearly do not meet this requirement of U-MPC.

One thing that clearly follows from the universal design table is that the process is perturbed by the changes emanating from the manipulated variables MV.PV and the feed forward variables FV.PV irrespective how these variables are changed or source of change. Furthermore, there are significant internal process variables effects among the process variables that also determine how the controlled variables CV.PV are affected. That is to say that the universal process table clearly establishes not only the innate characteristics of the process but also identifies all of the internal process effects that must be considered. Therefore, the CPR establishes a benchmark of all of the process relationships that must be considered by any method of control and optimization used; failing this the method of control and optimization will not be fully in compliance with the CPR and hence will not be able to deal with all of the possible process interactions and ultimately may fail to perform effectively and optimally. In this view of how a process is affected, the variables involved are all process based and not control action based which is either MV.SP or MV.OP. This is a critical departure from the way a process is modeled in the prior art MPC involving MV.SP and/or MV.OP as the input variables affecting the process. This is a significant and profound difference from the prior art MPC that characterizes the U-MPC design and its operation in terms of optimization and control. Based on this view, the U-MPC will utilize primarily MV.PV and FV.PV based models such as CV.PV/MV.PV and CV.PV/FV.PV respectively. That is to say, in accordance with the present invention, the U-MPC will be devoid of SP-based models such as CV.PV/MV.SP. It is important to note that all of the variables within CPR are intrinsic to the process and independent of control related variables namely, MV.SP and MV.OP. Consequently, the process models used in the U-MPC will be devoid of the dynamic effects of the regulatory controller relating to MV.SP in clear departure from the control models used in the prior art MPC.

Another requirement of U-MPC is evident from the design table. This relates to the fact that to model the process consistently and comprehensively, the models used in the U-MPC must be of type with the independent variable being MV.PV and/or FV.PV and not MV.SP or MV.OP. This requirement is clearly and markedly different from the control models that are customarily used in the prior art, which are mostly of type with MV.SP as being independent variable and occasionally with exception of few with MV.OP when the MV.SP regulatory control loop is opened up (U.S. Pat. No. 7,263,473). An illustration of the MV.SP based model (310) and MV.OP model (311) is shown in FIG. 3 by way of their imposition on the table. In case of CO.PV/TN.SP and CO.PV/TR.OP a long and thick arrow connecting them indicates the models. As shown in FIG. 3, it is clear that these models represent the Core Process Relationships assuming that all other core relationships affecting CO.PV are strictly unchanging. That is not the case in real process condition. In real process situations, all of the CPR affecting CO.PV is operative. These two models are valid under strict of conditions, which can only exist seldom. Therefore their use in real time control under real time process variations would mean significant amount of model mismatch. Further, the manner in which the prior art MPC correct for this model mismatch is as if the process gains of these two models are changed, which is clearly not the case. The error arises from the fact that the MV.PV values may change due to transitory effects and including unmeasured disturbance effects. In effect, these .SP and .OP models assume that path to the CV.PV does not involve other MV.PVs or do not change for that matter at all time. This is a serious shortcoming of the method of model used in the prior art and therefore a lot of problems relating to controller tuning and performance can be attributed to this. Instead, it is self evident from the design table that the right way to model the CPR is to have each and every relationship mapped in it defined separately and explicitly. This will result in having the process modeled using PV-based models with the exception of one non-PV based model that is MV.PV/MV.OP. In accordance with the present invention, it is envisaged that the U-MPC CAD system will have in it a database and a knowledge base of PV-based model of various processes and its sub-processes that can be made avail of in designing and building an U-MPC. For instance, for common pieces of equipment such as a refinery gas fired reboiler, the CAD system can have the basic pertinent process characteristics that can be loaded up as the default and later customize by the designer based on the specific equipment. Similarly, the CAD system can include the process characteristics of FCC unit gathered from a variety of plant sites within a large oil company for use in similar circumstances.

In accordance with the present invention, an U-MPC CAD system (400) can be designed and built that will allow the controller engineer (410) to spec out a universal MPC (415) that can be built with any of the available control and optimization technology incorporating best design practices (416). The U-MPC specification will be universal in its design for it to be independent of any particular MPC technology but rather that the available MPC technology be sufficiently complete and rich enough to meet the requirements of the U-MPC that is specified. Thus, with the aid of the U-MPC CAD system, the advanced control applications in the industry would become uniform in their specification and implementation. Further, the U-MPC CAD system is able to adjust the specification for any changes to the process or the equipment.

In accordance with the present invention, it is further embodiment of the invention that the MPC method of control and optimization shall preserve within it explicitly the dichotomy of the core process relationship and the control action relationship. In other words, the method of control and optimization should treat on one hand MV.PV as being independent variables for the purpose of CV.PV prediction whereas on the other hand treat MV.SP or MV.OP for actual process actuation leading to the desired change in MV.PV to affect the desired change in CV.PV. Further, it is clear that both these two aspects of the dichotomy can be considered separately or jointly as a matter of solution. This approach to optimization and control will produce a PV-based model predictive control system in which the process models remain independent of the controller actuation methods. Further, the system combines the core process models and the controller actuation models as necessary as disclosed below.

In FIG. 5 an alternate method of MPC based on MV.PV is outlined and is hereon called as PV-based MPC or simply PV-MPC. This alternate method of optimization and control (PV-MPC) (605) is primarily based on change in MV.PV and FV.PV as independent variables. That is to say, the PV-MPC will use change in a MV.PV (510) for prediction of changes in other MV.PVs and the related CV.PVs (511) for the purpose of determining the new steady state and dynamic state at every control cycle as part of calculation of new control moves (512). In other words, in the first part, the PV-MPC views control and optimization of the process entirely in terms of changes to MV.PV. In the second part, the required change in MV.PV is then translated in terms of either MV.SP or MV.OP. For the purpose of solution, both these two parts can be solved separately or jointly.

Since, in the end MV.PV can only be changed either by a change in MV.SP or MV.OP; the required change in either of them can be determined either external to the PV-MPC or from within the PV-MPC by embedding them as part of a unified model predictive control solution. For the sake of exposition, only the external method of actuation will be elucidated. However, those skilled in the art would appreciate that a unified model predictive control solution can be devised in which the control moves in either MV.SP or MV.OP can be determined simultaneously with the solution of MV.PV.

As an external method of actuation, at the end of its control move calculation, the PV-MPC will equate the change in MV.PV to the change in MV.SP (513) to cause change in its control output, MV.OP and therefore send a signal to the customary change in MV.SP as in the real time control system. In FIG. 6.1, the method of PV-based MPC as disclosed in FIG. 5 is further illustrated. (601) in FIG. 6.1 depicts Core Process in terms of its Core Process Models relating CV.PV to MV.PV and CV.PV to FV.PV. (602) in FIG. 6.1 refers to determination of control output actuation for change in MV.PV sought by PV-based MPC (604) that will be based on the Control Action Relationships. In the case where the regulatory controller relating to MV.PV is external to the PV-MPC, change in MV.PV is done by equating change in MV.SP and the change in MV.OP as shown in (602) would happen as a result of the regulatory controller action. However, in the case where the regulatory controller relating to MV.PV is internal to the PV-MPC, the change in MV.OP required for the change in MV.PV sought by the PV-MPC would be determined as part of the solution of the PV-MPC. (603) in FIG. 6.1 is to provide interconnection of change in control valve output (MV.OP) change to change in manipulated variables PV. On a cursory examination this would be considered as being inconsistent. However, in practice this switching from change in MV.PV to MV.SP at the end of control cycle is of no practical consequence. This is best understood in reference to FIG. 6.2. At time 0, a change in MV.PV is calculated by the PV-MPC and change in MV.SP is equated (610). As a consequence of the change in MV.SP, at the time 1, the MV.PV moves higher but not quite equal to the change in MV.SP sought. At time 2, the PV-MPC calculates another move in MV.PV and equates it to MV.SP change and sends a signal to the DCS for the change in SP. At time 2, once again MV.PV moves higher (611) but still lower than the MV.SP desired. This is repeated at successive time intervals. Gradually, the MV.PV will meet up with the MV.SP value. The real consequence of this behavior of the PV-MPC is that the MV.PV moves slowly but gradually to its final value. If this progress towards its final value is found to be slow then the tuning of the MV regulatory controller can be improved. In any case, the MV.PV not fast enough is not really an issue; its slow response in comparison with its change in SP can be improved as a matter of tuning, which is required in any case. In accordance with this invention, it is disclosed that the control cycle for each of MV.PV be set in consideration and compliance with the dynamic behavior of MV.PV when a change is made in MV.SP. This is to ensure that its control cycle is longer than the time delay and any inverse response of MV.PV. To preserve the dichotomy of the universal MPC, the PV-MPC will include the following variables limits constraints 7.1-7.4. It is obvious that MV.PV and MV.SP will be of unity gain and therefore their limit values in constraint 7.1 and 7.2 will be the same.

| | |
|---|---|
| $MV.SP^{min} <= MV.SP <= MV.SP^{max}$ | 7.1 |
| $MV.PV^{min} <= MV.PV <= MV.PV^{max}$ | 7.2 |
| $CV.PV^{min} <= CV.PV <= CV.PV^{max}$ | 7.3 |
| $MV.OP^{min} <= MV.OP <= MV.OP^{max}$ | 7.4 |

In the PV-MPC, MV.PV replaces MV.SP as the independent variable and instead considers MV.SP as an auxiliary variable, which is primarily used to actuate the regulatory controller(s). Therefore, the PV-MPC will optimize based on the steady state value of CV.PV using the PV-based control models and changes in MV.PV. As an auxiliary variable, in the steady state the MV.SP is considered to equate to the steady state value of MV.PV. Hence the following additional inequality constraints are appended to the steady state optimization of the PV-MPC.

| | |
|---|---|
| $-\epsilon <= (MV.PV^s - MV.SP^s) <= \epsilon$ | 7.5 | where
$\epsilon$ is a small positive number
$MV.PV^S$ is steady state value of MV.PV
$MV.SP^S$ is steady state value of MV.SP The PV-MPC is adaptable to embed MV.SP for the purpose of steady state constraint where the regulatory controller relating to the MV.SP is an external regulatory controller. In which case, the PV-MPC will include MV.PV/MV.OP model along with pertinent $MV.PV/MV.PV_j$ models and MV.OP as an additional auxiliary variable. MV.OP as an auxiliary variable is manipulated external to the PV-MPC. This will ensure that in the steady state optimization, MV.SP will be constrained directly and not through the customary controller output models of MV.OP. In this setup, only one model relating to MV.OP is required, i.e. model MV.PV/MV.OP. The PV-MPC is therefore flexible in internally opening up the cascading regulatory controller involving MV.SP to MV.OP. In the case where, there is no cascading control loops, MV.OP will be treated as a manipulated variable within the PV-MPC. Constraint 7.5 allows embedding of a regulatory controller within a MPC as elucidated in another patent by the present inventor U.S. Pat. No. 7,194,318 and performs a built-in method of tracking MV.SP to MV.PV when MV.OP saturates.

In practice there is no direct way to realize a dynamic change in MV.PV except through a change either in MV.SP or MV.OP. In particular, where MV.SP is an external regulatory control loop, this dilemma of actuation can be resolved by either assuming a certain relationship between MV.SP and MV.PV or solving a separate sub-problem. For example, in its simplest form,

| | |
|---|---|
| $\Delta MV.SP^d = \mu * \Delta MV.PV^d$ | 8 |
| Where | |
| $\mu$ is a positive number. | |

In practice, Equation 8 can be used effectively for most regulatory controllers. Most basic regulatory controllers such as temperature controller, pressure controller are devoid of inverse response in that they respond to the actions of a feedback controller by moving the process variable in the same direction as the control effort. Even though processes may oscillate in response to the controller's actions, but the process variables' first reaction will usually be in the same direction as the control effort. Equation 8 can be used without loss of control if the regulatory control loops are without inverse response. If the regulatory control loop exhibits small, quick inverse responses, Equation 8 may still be used with an increase in the control cycle time sufficient to clear the inverse response. Any mismatch in response of $\Delta MV.PV^d$ will not induce any model mismatch error in the PV-MPC. For the most part, the actual $\Delta MV.PV^a$ will be less than $\Delta MV.PV^d$. However, in the situation where it is not, $\mu$ in Equation 8 can be tuned to a lower value.

Furthermore, a more rigorous method of solution can be adopted in which the controller output, MV.OP is directly manipulated for the desired manipulated process value change rather than through the change in the set point. That is, a sub-problem relating to controlling the manipulated variable MV.PV to its desired target as per the PV-MPC solution can be solved for more complex regulatory control loop that may involve manipulating the controller output directly. In fact, a full-fledged constrained dynamic control problem relating to this can be solved. For instance, $$\Delta MV.OP^d = U(MV.SP, MV.PV, FV.PV) \qquad 9$$

Where

U constitutes a regulatory controller involving MV.SP, MV.PV and pertinent feed forward variables, FV.PV. U( ) can be an external controller to the PV-MPC or it can be embedded within the PV-MPC.

Furthermore, irrespective of how well MV.PV and MV.SP remain close at or near MV.OP saturation, the PV-MPC will not experience any undue increase in the model mismatch error of the controlled variables. The PV-MPC does not suffer from the non-linear behavior effect of the MV.OP near its saturation to the same extent as the traditional set point based MPC (SP-MPC) and the output based MPC (OP-MPC). From the universal design table, it is clear that MV.PV can be changed either by a change in MV.SP or MV.OP. Either way, the PV-MPC is adaptable to achieve a change in MV.PV.

The PV-MPC prevents model mismatch error from propagating throughout the core process variables. Model mismatch error is isolated in the PV-MPC in accordance with the PV-Models as shown in the example above. This isolation of model mismatch error from one set of variables to other connected variables makes PV-MPC significantly more tolerant of measured/unmeasured disturbance effects. Consequently, the PV-MPC avoids unwarranted control moves from the spread of model mismatch error.

In the ultimate case of where no further cascading of MV can be accomplished when MV is MV.OP then the control cycle can be adjusted in consideration of process noise rather than not in consideration of dead time and inverse response. This adjustment of control cycle of MV.SP or MV.OP in consideration of how MV.PV behaves is something seldom done in the prior art because they all are considered to operate with the same cycle.

Summarizing, the PV-based MPC can be characterized in its three components as follows, Use of PV-based Models in optimization and control,
Embedding of Regulatory Controller with MV.PV/MV.OP models and
Devising a suitable method of control actuation to achieve desired change in MV.PV.

Debutanizer Simulation Example

The toughest benchmark against which to assess the integrity and robustness of any control system is to see how it behaves when one or more control valve saturates due to unmeasured disturbance effects. In saturation, the controller experiences the most modeling errors and the reduced degrees of freedom with which to control. The simulation trends in FIG. 10 relate to a debutanizer unit in a refinery. Performance of the SP-MPC and PV-MPC are compared side by side for the same pattern of unmeasured disturbance in the fuel gas calorific value (see Trend 680). As a measure of performance, standard deviation of (PV) and standard deviation of model mismatch error (ME) of the controlled variables are compared.

It is evident from the trends (FIG. 10); the PV-MPC consistently produces significantly lower standard deviations of PV and ME of the controlled variables shown with the exception of the reboiler temperature, TB.PV. The standard deviation (TB.ME) is same as expected because the unmeasured disturbance in the fuel gas k-value would affect both the SP-MPC and the PV-MPC equally. However, the standard deviation of (TB.PV) for the PV-MPC is twice as low indicating that for the same unmeasured disturbance pattern, the PV-MPC is twice more robust in controlling TB.PV. This reduced variance of TB.PV in the PV-MPC produces correspondingly reduced variance in the product qualities.

The trends in FIG. 10 show that the PV-MPC performs continuously and flawlessly in response to the unmeasured disturbances in the fuel gas calorific value, whereas, in the case of the SP-MPC, for a while, the PT.PV does not track PT.SP (c.f. Trend 357). In fact, during this time, standard deviation of PV and ME of all the controlled variables affected by PT.PV show the largest increase. This is consistent with what would be expected from the model dislocations occurring when the regulatory controller SP does not track its PV value in a SP-MPC. In contrast, in the case of the PV-MPC, the PT.SP never loses track of the PT.PV and consequently the standard deviation of the variables do not show the same increase. The PV-MPC is able to keep PT.SP in track by it being an embedded regulatory controller. Additionally, in the PV-MPC, standard deviation (PT.ME) is also much less than that in the case of SP-MPC. The PV-based model of PT.PV with respect to TB.PV filters out the unmeasured disturbance effect of the fuel gas k-value.

The model mismatch error standard deviation for TB.PV is clearly correlated to the variation in the fuel gas calorific value. However, in the case of PV-MPC, model mismatch error is nonexistent for overhead impurity or bottom impurity because the PV-based control models confine model mismatch error from the unmeasured fuel gas calorific value variation to TB.PV only. This is one of the major underlying benefits of PV-MPC using PV-based control models. What this demonstrates is that within the PV-MPC, the model mismatch error gets filtered out nearest to its source and therefore do not spread to the rest of the process variables.

Failure to track MV.SP to MV.PV is a serious flaw in classic MPC because it generates modeling error that cannot be easily fixed. This problem is exacerbated when unmeasured disturbance adds to the increased model mismatch error from the disturbance effects. As a result, many MVs are moved unnecessarily, which disturbs the process and in turn causes uncontrollable product quality deterioration.

PV-Model Identification

Another significant benefit of the PV-based models is that they are intrinsically much easier to identify than their SP version. Since, the PV-based models are devoid of the regulatory controller dynamic effect, they can be identified without having to perform plant testing involving the stepping up and down of the manipulated variables' set points. Additionally, in most cases, the models can be identified from normal operating data variance, which minimizes the need to conduct full plant test.

Another major benefits of the PV-based model identification is that it eliminates the entire range of MV.OP models as in the case of the SP-MPC and the need to provide a reliable and effective method of valve linearization as in the case of the OP-MPC. As a result, a PV-MPC can be built faster at a lower cost that will last much longer than both the SP and OP-based MPCs.

PV-MPC offers the most cost efficient way to upgrade an advanced control system for process changes. PV-MPC avoids expensive plant testing as opposed to the SP and OP based approaches. For example, a low cost item such as a control valve replacement does need not require expensive plant re-testing that can cost tens of thousands of dollars. In fact, the high cost of re-testing required with the SP-MPC and OP-MPC will remain the same whether the process changes cost hundreds of dollars or more. In contrast, the cost of upgrading a PV-MPC will be commensurate with the extent and the nature of the process changes.

In addition, the PV-MPC is independent of regulatory controller tuning effects, which reduces implementation and maintenance costs dramatically. SP-MPCs are less efficient than the PV-based PV-MPC because the SP-based system imparts great costs for plant testing and causes gradual and deliberate product quality losses as the production rate is maximized. SP based models fail to mitigate the problems arising from control valve saturation and model mismatch errors without having to perform a complete overhaul involving additional plant testing.

Another embodiment of the present invention relates building an alternate design of operator interface to what is currently used in the prior art. The CPR part of the U-MPC is to elucidate the inherent process variables relationship that an operator can use to reason with about the changes affecting the process. It is essentially a cause effect relationship map of the process variables in terms of their process value (PV). In the prior art, the process variables causal relationship map is missing from the interface. For most part, the operator would rely on self knowledge of the causal relationship learnt from the training and experience. No doubt the operator would use the self-knowledge of the causal models in the decision-making. However, often due to a variety of reasons, the operator may not be able to recall consistently the causal model and therefore, at times may miss some aspects of it or simply be blind sided. The CPR therefore exclusively involves PV values.

The unified operator interface can be integrated with the events relating to alarm annunciation and alarm management. For instance, when an alarm is annunciated for a process variable, the unified operator interface table relating to it can be displayed for the operator. For instance, a CV.PV is in alarm, its entire table can be displayed showing the alarm status of all of the related variables. Thus, if any of the manipulated variables MV.OP, or MV.PV are in alarm status then those will show up accordingly. Thus, the operator interface table can be displayed with alarm status of all of the variables in it. This would therefore filter the alarm status of those variables. A temporary alarm suppression of all of the alarms in all of the open tables can be done indicating while the operator is responding to them. The unified operator interface table offers a variety of manner in which it can be used dynamically because of the virtue of the fact that it unifies all of the variables that an operator may be concerned during normal operation as well as during an abnormal operation.

The Operator Interface Table can be constituted by providing a computer system adjunct to the DCS system for control to gather the process variables tags, their status as for control and other relevant data. The Operator Interface Table can be thus generated automatically and amended for use in real time in accordance with the process situation and the operator's requirements. An example of use of the Universal MPC design table embedded in the operator interface is shown in FIG. 7.

Summarizing, the U-MPC as per the present invention will comprise of;

a universal MPC design table mapping (or another equivalent form of mapping) Core Process Relationships and Control Action Relationship independent of any method of MPC, the U-MPC design table will be used by the control engineer to formulate a design specification for control and optimization and also adapt it for any change in the process design or operation, an U-MPC will have MV.PV and FV.PV based models for control and optimization in contrast to the customary MV.SP-based models and MV.OP-based models in the prior art, an U-MPC will categorize the MVs and CVs in accordance with their variance characteristics in organizing appropriate regulatory control loops within it, an U-MPC will determine change in MV.PV as control moves, an U-MPC will actuate change in MV.SP appropriately to realize the desired change in MV.PV, an U-MPC will have an explicit built-in method of tracking MV.SP to MV.PV when the control valve saturates, an U-MPC will have a multi-frequency sub-controllers within it in accordance with the core process relationship of the MVs, the sub-controllers may include further sub-controllers and so on, an U-MPC will be a multi-controllers system comprising hierarchical and distributed controllers.

It is further envisaged that the U-MPC design process will be done in a computer-aided system with all of relevant process database (413) and process knowledge base (414).

In contrast, in the prior art, MPC is applied in accordance with the method of control and optimization rather than in strict compliance with the process innate characteristics. For instance, in the prior art, the SP-based models are used even though it is clearly evident that these types of models do not fully and accurately represent the actual process behavior under varying conditions. Similarly, in the prior art, recently an alternate method of MPC has been introduced in which the SP-based models are replaced with MV.OP-based models in an attempt to overcome some of the shortcomings of the SP-based models. However, in doing so, this alternate method of MPC introduces its own shortcomings. In accordance with the U-MPC table, it is clear that both SP-based models and OP-based models do not fully and adequately represent the core process relationships and will therefore in violation of the requirements of the U-MPC design. Therefore, it is not surprising that the MPC-methods using either of these two types of models will have certain shortcomings.

Another embodiment of the present invention relates to improving the prior art MPC to conform to the requirements of U-MPC as set forth herein. The prior art MPC with SP-based MV, consists of the following relationships, a reduced and different set of relationship than what is required of U-MPC

| | |
|---|---|
| (MV.SP, MV.OP*) | 10.1 |
| (MV.SP, CV.PV) | 10.2 |
| (FV.PV, CV.PV) | 10.3 |
| $MV.SP^{min} <= MV.SP <= MV.SP^{max}$ | 11.1 |
| $MV.PV^{min} <= MV.PV <= MV.PV^{max}$ | 11.2 |
| $CV.PV^{min} <= CV.PV <= CV.PV^{max}$ | 11.3 |
| $MV.OP^{min} <= MV.OP <= MV.OP^{max}$ | 11.4 |

In the prior art classic MPC, relationship 10.1 is used to set operating constraints limits of MV.SP. For instance, when MV.OP is at saturation limit, MV.SP is not changed any further. Although this seems like a reasonable solution, however, in practice it does not work very well. Even though, MV.SP may remain unchanged, however, MV.PV can vary due to disturbances, resulting in a divergence of MV.PV and MV.SP. In other words, MV.SP does not match with MV.PV; the MV.SP fails to track MV.PV. The process continues to be affected by changes in MV.PV, however, the prior art MPC continues to use no change in MV.SP for prediction. Consequently, the model mismatch error continues to build up whilst the MV.SP remains unchanged due to MV.OP saturation. The model mismatch error impairs performance of the prior art MPC and therefore it is common to find that at or near control valve saturation, quality of control deteriorates with increased variance in the controlled variables. The method of constraining MV.SP to MV.OP saturation as used in the prior art MPC does not allow the MV.SP to track to MV.PV whilst the MV.OP moves remains at valve saturation. This failure of MV.SP to track MV.PV at valve saturation is an inherent shortcoming of the prior art MPC.

In the prior art relationship 10.1 is exclusively relied upon to constrain MV.SP. MV.OP is treated in the same way as any CV.PV for control and optimization, including for prediction. No provision is made in predicting MV.OP to account for the fact that at the saturation limit, the process value of MV.OP would remain fixed, e.g at 100 percent. The valve saturation is common phenomena and therefore, in accordance with the present invention, the method of predicting MV.OP should reflect this. Therefore, it is proposed that the following changes be made to in the method of predicting future value of MV.OP when the control valve is at saturation limit. In FIG. 8, both the prior art method of prediction of MV.OP 804 and the improved method of prediction (803) in accordance with the present invention is shown. The improved method of MV.OP prediction requires that when MV.OP is at saturation limit (801), its future value (803) should not be corrected for any error of current value of MV.OP and its predicted value. That is to say, at or close to saturation, the model mismatch error correction should not be applied to MV.OP. This suspension of model mismatch correction at or close to valve saturation would provide appropriate violation from the limit to cause the MV.SP (824) to be changed so as to bring it closer to the value of MV.PV (822). This results in the MV.SP (823) starting to move towards MV.PV (822) resulting the desired tracking of MV.SP to MV.PV. As (803) starts to move back towards the saturation limit and crossing below it, the normal method of model mismatch correction is resumed for MV.OP. The end result of this modified method of model mismatch correction is that MV.SP starts to begin its move towards (823) MV.PV in response to (803) changes. In absence of this proposed improvement, in the prior art MPC, the MV.SP will move away from (823) partially but not fully to the value of MV.PV (824). Thus, resulting in an offset between MV.SP and MV.PV, in other words MV.SP (824) not fully tracking MV.PV. It is further disclosed that to improve quality of control, MV.OP be included in the steady state optimization part of the generic prior art MPC but not included in the dynamic controller. That is to say, MV.OP be used as a controlled variable for the purpose of steady state optimization constraints and preferably not participate in the determination and calculation of dynamic moves.

The proposed change in the method of MV.OP prediction at or close to valve saturation as per the present invention will eliminate the inevitable offset between in MV.SP and MV.PV of the prior art MPC. This will improve quality of control at or near valve saturation. It will minimize the increased variance that is often present in the prior art MPC at or near control valve saturation.

A further embodiment of the present invention as it relates to the prior art MPC can be made as follows. This is achieved by addition of the relationship 10.4 and 11.5 to the prior art MPC. Thus, the modified relationship set would include,

| | |
|---|---|
| (MV.SP, MV.OP*) | 10.1 |
| (MV.SP, CV.PV) | 10.2 |
| (FV.PV, CV.PV) | 10.3 |
| (MV.SP, MV.PV*) | 10.4 |
| (FV.PV, MV.PV*) | 10.5 |
| $MV.SP^{min} <= MV.SP <= MV.SP^{max}$ | 11.1 |
| $MV.PV^{min} <= MV.PV <= MV.PV^{max}$ | 11.2 |
| $CV.PV^{min} <= CV.PV <= CV.PV^{max}$ | 11.3 |
| $MV.OP^{min} <= MV.OP <= MV.OP^{max}$ | 11.4 |
| $-\epsilon <= (MV.SP - MV.PV) <= \epsilon$ | 11.5 |

The relationship 10.4 above ordinarily is not included in the prior art MPC. By definition, relationship 10.4 is of unity gain with dynamic response in accordance with the regulatory controller tuning for it. MV.PV* is to be treated in the same manner as MV.OP* as it relates to its use in steady state optimization constraints and dynamic move calculation. That is MV.PV* is used solely for constrained steady state optimization and preferably not in determination and calculation of dynamic moves of the manipulated variables.

Thus, inclusion of relationship 10.4 and constraint 11.5 provide for a built-in automatic tracking of MV.SP to MV.PV upon MV.OP saturation. The constraint 11.5 provides for an automatic tracking of MV.SP when MV.OP saturates. When not at saturation, constraint 11.5 will be satisfied with MV.PV responding to satisfy MV.SP (921). However, upon MV.OP saturation, MV.PV (922) does not equate to MV.SP. However, when the constraint 11.5 is included as a constraint in steady state optimization of the prior art MPC, MV.SP can be changed to equate MV.PV whenever MV.OP saturates. Thus relationship 11.5 kicks in when MV.OP saturates to cause MV.SP to track MV.PV. In view of this, MV.OP can continue to be treated same as any CV.PV for model mismatch correction as customarily done in the prior art. Again, MV.PV* is to be included in steady state constrained optimization and not to be included in the dynamic move calculation. FIG. 9 depicts how this embodiment would work. It shows how the customary prediction of MV.OP (904) as done in the prior art MPC can be used and still permit MV.SP to track MV.PV (923) when MV.OP (903) saturates.

In summary, the present invention offers a method for designing, building and implementing a MPC based on the requirements of a universal-MPC derived from Core Process Relationships that are free of any particular method of MPC. This devoid of any specific MPC method of designing a universal MPC will provide a uniform and consistent implementation and operation of MPC for any type of process. Consequently, this will help to build MPCs that are built without the customary design defects in the prior art and further make any adaptation to the MPC for any changes in the process design and operation far more easier than that is done presently in the prior art. Those skilled in the art would recognize the general applicability of the present invention and that it is not limited to any particular form of model, linear or non-linear. Further, those skilled in the art would recognize that the various component of the present invention can be combined with the parts of the prior art for improved results and design.

I claim:

1. A method of specifying, designing and operating a universal model predictive controller for a process having a plurality of independently controllable, manipulated variables, none or more of feed forward variables and at least one controlled variable dependent upon said independently controllable, manipulated variables comprising the steps of:
   characterizing said process in its core process relationships as determined from innate characteristics of said process independent of method of control actuation;
   characterizing method of control actuation to be applied to said process in terms of control action relationships consistent with desired closed loop performance;
   interconnecting said core process relationships and said control action relationships; and
   operating said universal model predictive controller comprising explicitly said core process relationships (CPR) and said control action relationships (CAR).

2. The method of claim 1, wherein said innate characteristics of said process comprises as relating to intrinsic process behavior consistent with process operation, physical characteristics, size, material and energy holdup and transport lag present within said process.

3. The method of claim 1, wherein said characterizing said process additionally comprises characterizing process variables as relating to process value of said controlled variables represented as (CV.PV), process value of said manipulated variables represented as (MV.PV) and process value of said feed forward variables represented as (FV.PV), where process value (.PV) refers to measured value of the respective process variables.

4. The method of claim 3, wherein said characterizing said process variables additionally comprises defining interdependency of said process variables based on cause and effect as determined from innate characteristics of said process.

5. The method of claim 4, wherein said defining interdependency of said process variables additionally comprises generating core process models comprising of dynamic models relating process value of said controlled variables, CV.PV to a unit change in process value of each of said manipulated variables, MV.PV and dynamic models relating said process value of controlled variables CV.PV to a unit change in process value of said feed forward variables FV.PV.

6. The method of claim 1, wherein said characterizing method of control actuation additionally comprises characterizing control variables as relating to a plurality of manipulated variables set point (MV.SP) and a plurality manipulated variables output (MV.OP) in relation to said manipulated variables process values, MV.PV.

7. The method of claim 6, wherein said characterizing said control variables additionally comprises defining interdependency of a control variable MV.SP and a control variable MV.OP in accordance with chosen method of control actuation.

8. The method of claim 1, wherein said interconnecting said core process relationships (CPR) and said control action relationships (CAR) additionally comprises of connecting a control variable MV.OP to a manipulated variable MV.PV in accordance with said method of control actuation and generating dynamic model relating said MV.PV to a unit change in said MV.OP.

9. The method of claim 1, wherein said operating a model predictive controller additionally comprises the steps of:
   predicting future values of said CV.PV based on past values of said MV.PV and said FV.PV using generated said core process models as recited in claim 5;
   calculating future moves in said MV.PV in accordance with certain optimization and control algorithm to drive said process to certain desired performance target;
   applying first move in said future moves in said MV.PV to generate control actuation in at least one said control variables;
   applying said control actuation to said process;
   measuring response of said process generated from application of said control actuation; and
   repeating the above method of optimization and control to move said process towards optimum targets.

10. The method of claim 9, wherein calculating future moves in said MV.PV additionally comprises said optimization and control algorithm to include the following set of constraints:
$MV.SP^{min}<=MV.SP<=MV.SP^{max}$,
$MV.PV^{min}<=MV.PV<=MV.PV^{max}$,
$CV.PV^{min}<=CV.PV<=CV.PV^{max}$,
$MV.OP^{min}<=MV.OP<=MV.OP^{max}$,
$-\epsilon<=(MV.PV^S-MV.SP^S)<=\epsilon$,
where,
$\epsilon$ is a small positive number,
$MV.PV^S$ is steady state value of MV.PV,
$MV.SP^S$ is steady state value of MV.SP,
$MV.SP^{min}$ is minimum value of MV.SP,
$MV.SP^{max}$ is maximum value of MV.SP,
$MV.PV^{min}$ is minimum value of MV.PV,
$MV.PV^{max}$ is maximum value of MV.PV,
$CV.PV^{min}$ is minimum value of CV.PV,
$CV.PV^{max}$ is maximum value of CV.PV,
$MV.OP^{min}$ is minimum value of MV.OP,
$MV.OP^{max}$ is maximum value of MV.OP.

11. The method of claim 9, wherein applying first move in said MV.PV additionally comprises method of affecting move in either said MV.SP or said MV.OP depending on interdependency of said MV.SP, said MV.OP and said MV.PV.

12. A method of specifying, designing and operating an operator process control interface for a process having a plurality of independently controllable, manipulated variables, none or more of feed forward variables and at least one controlled variable dependent upon said independently controllable, manipulated variables comprising the steps of:
   characterizing said process in its core process relationships as determined from innate characteristics of said process independent of method of control actuation;
   characterizing method of control actuation to be applied to said process in terms of control action relationships consistent with desired closed loop performance;
   interconnecting said core process relationships and said control action relationships for design analysis of control and operation of said process in a computer aided design system by a designer;

organizing said core process relationships in accordance with a certain defined criteria using said computer aided design system; and operating said operator process control interface comprising explicitly said core process relationships (CPR) and said control action relationships (CAR).

13. The method of claim 12, wherein said innate characteristics of said process comprises as relating to intrinsic process behavior consistent with process operation, physical characteristics, size, material and energy holdup and transport lag present within said process.

14. The method of claim 13, wherein said characterizing said process additionally comprises characterizing process variables as relating to controlled variables process value (CV.PV), manipulated variables process value (MV.PV) and feed forward variables process value (FV.PV).

15. The method of claim 14, wherein said characterizing said process variables additionally comprises defining interdependency of said process variables based on cause and effect as determined from said innate characteristics of said process.

16. The method of claim 15, wherein said defining interdependency of said process variables additionally comprises displaying and interacting with core process models comprising of dynamic model relating a controlled variable CV.PV to a unit change in each of said manipulated variable MV.PV and generating dynamic model relating said controlled variable CV.PV to a unit change in said feed forward variable FV.PV.

17. The method of claim 12, wherein said characterizing method of control actuation additionally comprises characterizing control variables as relating to a plurality of manipulated variables set point (MV.SP) and a plurality manipulated variables out put (MV.OP) in relation to said process variables MV.PV.

18. The method of claim 17, wherein said characterizing said control variables additionally comprises defining interdependency of said control variable MV.SP and said control variable MV.OP in accordance with chosen method of control actuation.

19. The method of claim 12, wherein said interconnecting said core process relationships (CPR) and said control action relationships (CAR) additionally comprises of connecting said control variables MV.OP to said process variables MV.PV in accordance with said method of control actuation and displaying dynamic model relating said MV.PV to a unit change in said MV.OP.

20. The method of claim 12, wherein said organizing said core process relationships additionally comprises of dynamically updated color scheme in response to certain alarm conditions, alarm filtering and process status.

21. A method of modified model predictive control called PV-based MPC or simply PV-MPC for a process having a plurality of manipulated variables set point (MV.SP), none or more of feed forward variables process value (FV.PV), manipulated variables out put (MV.OP) and at least one controlled variable process value (CV.PV) comprising the steps of:

including manipulated variables process value (MV.PV) as additional variables in a method of optimization and control;

characterizing said process in terms of control models comprising of:

dynamic change in said CV.PV to a unit change in said MV.PV, (MV.PV, CV.PV);

dynamic change in said CV.PV to a unit change in said FV.PV, (FV.PV, CV.PV);

dynamic change in said MV.OP to a unit change in said MV.SP, (MV.SP, MV.OP);

dynamic change in said MV.OP to a unit change in said FV.PV, (FV.PV, MV.OP);

dynamic change in said MV.PV to a unit change in said MV.SP, (MV.SP, MV.PV); and dynamic change in said MV.PV to a unit change in said FV.PV, (FV.PV, MV.PV);

including explicitly the following set of constraints $MV.SP^{min} <= MV.SP <= MV.SP^{max}$
$MV.PV^{min} <= MV.PV <= MV.PV^{max}$
$CV.PV^{min} <= CV.PV <= CV.PV^{max}$
$MV.OP^{min} <= MV.OP <= MV.OP^{max}$ where $MV.SP^{min}$ is minimum value of MV.SP,
$MV.SP^{max}$ is maximum value of MV.SP,
$MV.PV^{min}$ is minimum value of MV.PV,
$MV.PV^{max}$ is maximum value of MV.PV,
$CV.PV^{min}$ is minimum value of CV.PV,
$CV.PV^{max}$ is maximum value of CV.PV,
$MV.OP^{min}$ is minimum value of MV.OP,
$MV.OP^{max}$ is maximum value of MV.OP; and operating said modified model predictive controller comprising of steady state and dynamic state optimization.

22. The method of claim 21, wherein operating said PV-based MPC additionally comprises the steps of:

suspending application of model mismatch correction to said MV.OP when it is at or very near to its saturation value; and resuming application of model mismatch correction to said MV.OP when it is operating substantially away from its saturation value.

23. The method of claim 21, wherein said including manipulated variables process value (MV.PV) as additional variables in a method of optimization and control comprises such that:

said MV.PV variables are formulated both as independent variables and dependent variables to perform optimization and control, and provide for a method by which the changes in said MV.PV variables obtained as result of the optimization and control are translated in terms of changes in said MV.SP variables or MV.OP variables depending on the method of control actuation used.

24. The method of claim 23, wherein said MV.PV variables are formulated both as independent variables and dependent variables comprises including the following inequality constraints in the method of optimization and control:

$-\epsilon <= (MV.PV^S - MV.SP^S) <= \epsilon$ where $\epsilon$ is a small positive number
$MV.PV^S$ is steady state value of MV.PV,
$MV.SP^S$ is steady state value of MV.SP.

25. The method of claim 21, wherein said operating the PV-based MPC additionally comprises the steps of control cycle:

reading change in said MV.PV and FV.PV from a real time data source, predicting future values of said CV.PV using said control models and said change in said MV.PV and FV.PV, performing optimization and control in real time to determine future changes in said MV.PV, applying first future change in said MV.PV as change in said MV.SP and where applicable change in MV.OP depending on method of control actuation, repeating the steps of control cycle to drive the process variables to optimum values.

* * * * *